US007546425B2

(12) United States Patent  
Mori et al.

(10) Patent No.: US 7,546,425 B2  
(45) Date of Patent: *Jun. 9, 2009

(54) DATA PROCESSOR WITH A BUILT-IN MEMORY

(75) Inventors: Kenichi Mori, Fujisawa (JP); Atsushi Kunimatsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,338

(22) Filed: Jun. 7, 2007

(65) Prior Publication Data

US 2007/0233976 A1 Oct. 4, 2007

Related U.S. Application Data

(62) Division of application No. 11/374,048, filed on Mar. 14, 2006, now Pat. No. 7,237,072, which is a division of application No. 10/241,458, filed on Sep. 12, 2002, now Pat. No. 7,035,982.

(30) Foreign Application Priority Data

Sep. 27, 2001 (JP) ............................. 2001-298635

(51) Int. Cl.  
*G06F 13/00* (2006.01)

(52) U.S. Cl. ..................... 711/151; 711/150; 711/158

(58) Field of Classification Search .................. 711/168  
See application file for complete search history.

(56) References Cited

U.S. PATENT DOCUMENTS 3,343,140 A 9/1967 Richmond et al.

| 4,949,244 | A | 8/1990 | Kubo et al. |
| 5,070,444 | A | 12/1991 | Kubo et al. |
| 5,099,417 | A | 3/1992 | Magar et al. |
| 5,363,500 | A | 11/1994 | Takeda |
| 6,202,137 | B1 | 3/2001 | Ottinger |
| 6,327,681 | B1 | 12/2001 | Yamagishi et al. |
| 6,370,558 | B1 | 4/2002 | Guttag et al. |
| 6,393,520 | B2 | 5/2002 | Yoshikawa et al. |
| 6,473,841 | B1 | 10/2002 | Ueda et al. |
| 6,587,110 | B1 | 7/2003 | Kunimatsu et al. |
| 6,587,917 | B2 | 7/2003 | Simmons |
| 6,675,267 | B2 | 1/2004 | Rovati |
| 6,704,018 | B1 | 3/2004 | Mori et al. |
| 6,809,422 | B2 | 10/2004 | Saito et al. |

(Continued)

FOREIGN PATENT DOCUMENTS

JP 59-121455 7/1984

(Continued)

*Primary Examiner*—Hetul Patel  
(74) *Attorney, Agent, or Firm*—Oblon, Spivak, McClelland, Maier & Neustadt, P.C.

(57) ABSTRACT

A memory-built-in data processor comprises a controller connected to an external unit and a memory via first and second buses, and a data processor performing readout/write-in of data with respect to the memory via a third bus, the controller and the second bus, the controller performing arbitration between a first access requirement input via the first bus and a second access requirement input from the data processing unit via the third bus, the memory, the first bus, the second bus, the third bus, the controller, and the data processor being integrated in an integrated circuit.

4 Claims, 8 Drawing Sheets

U.S. PATENT DOCUMENTS

| | | |
|---|---|---|
| 2002/0083311 A1 | 6/2002 | Paver |
| 2003/0177288 A1 | 9/2003 | Kunimatsu et al. |
| 2003/0200422 A1 | 10/2003 | Hironaka et al. |

FOREIGN PATENT DOCUMENTS

| | | |
|---|---|---|
| JP | 1-241642 | 9/1989 |
| JP | 5-189549 | 7/1993 |
| JP | 8-50651 | 2/1996 |
| JP | 9-167242 | 6/1997 |
| JP | 10-269167 | 10/1998 |
| JP | 11-39278 | 2/1999 |
| JP | 11-185467 | 7/1999 |
| JP | 2000-67573 | 3/2000 |
| JP | 2000-293709 | 10/2000 |
| JP | 2001-117893 | 4/2001 |

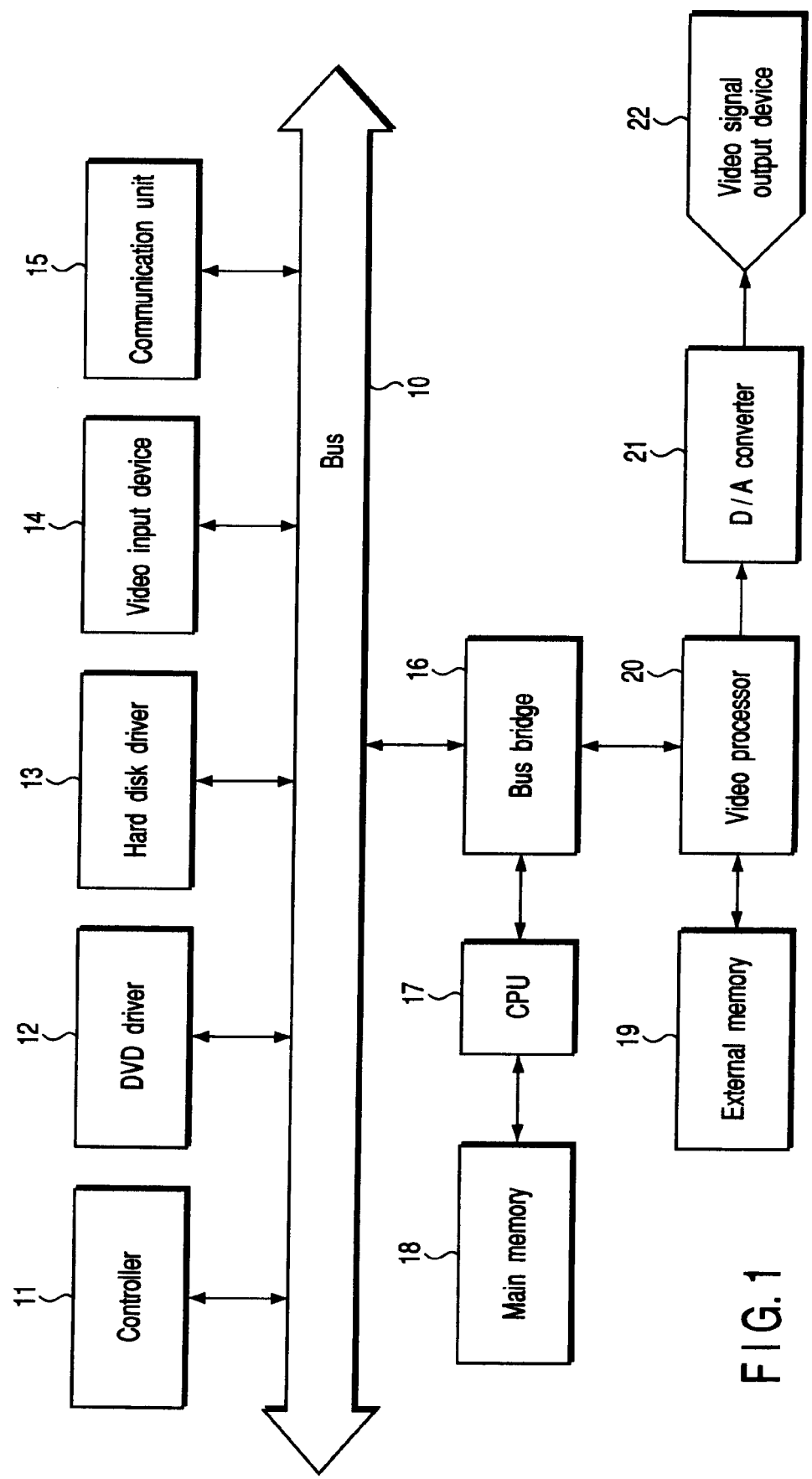
F I G. 1

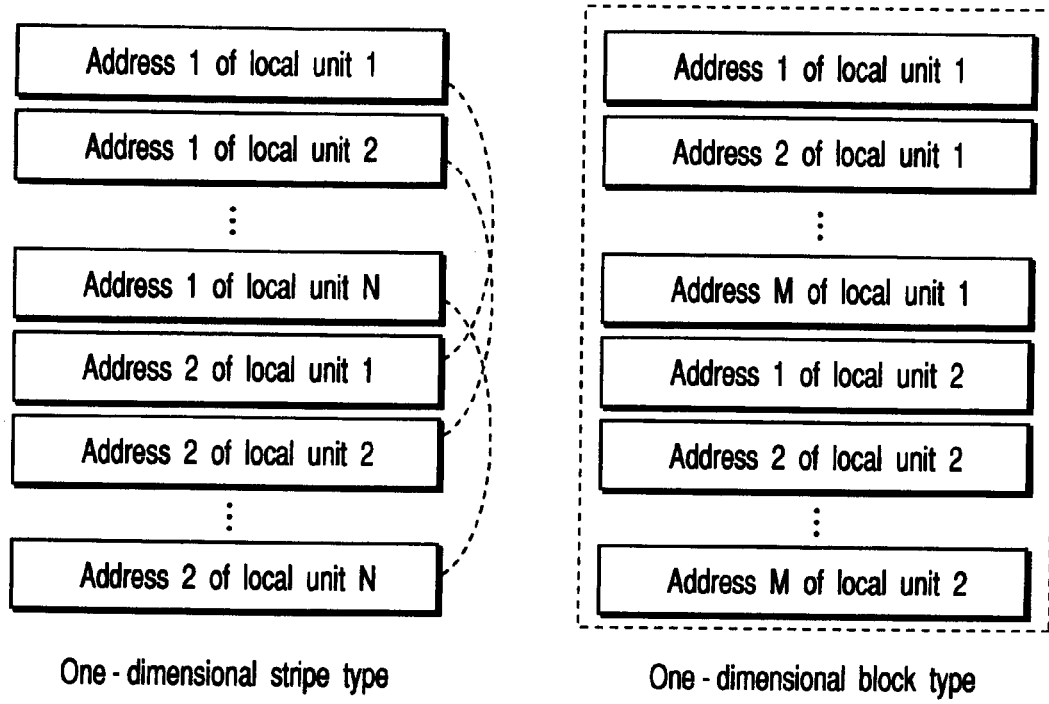
FIG. 5A  One-dimensional stripe type
FIG. 5B  One-dimensional block type
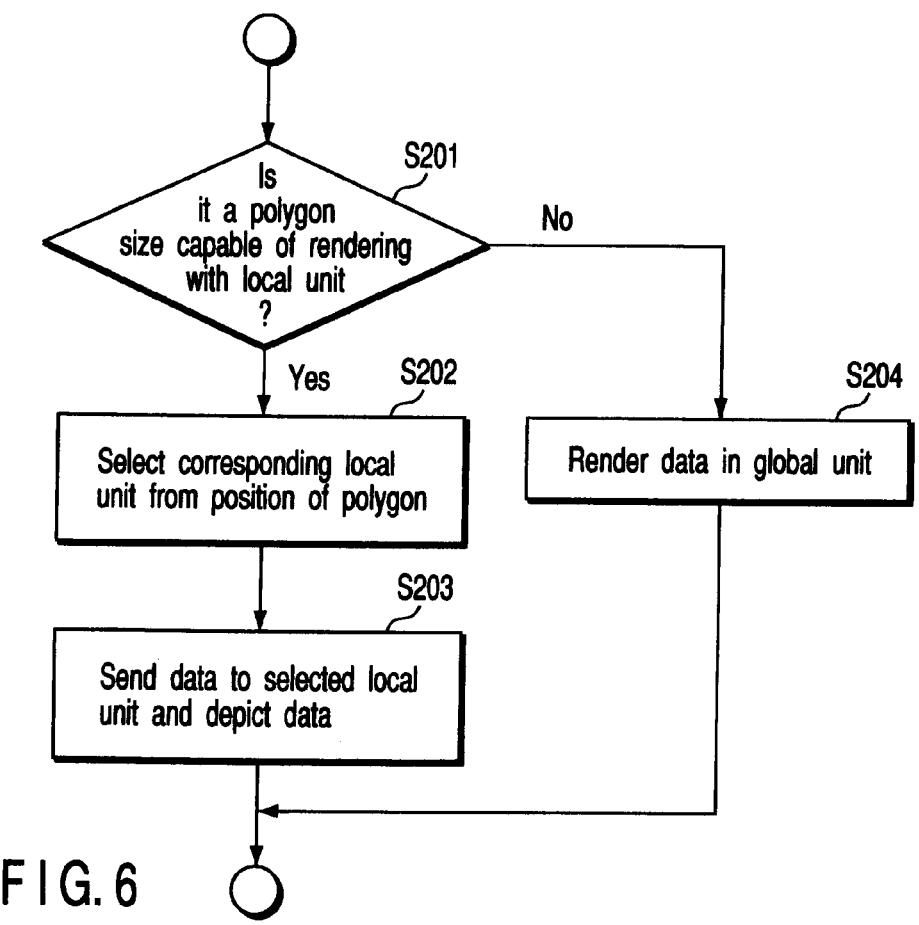
FIG. 6

DATA PROCESSOR WITH A BUILT-IN MEMORY

CROSS-REFERENCE TO RELATED APPLICATIONS

This application is a division of U.S. application Ser. No. 11/374,048, filed on Mar. 14, 2006, now U.S. Pat. No. 7,237,072, which in turn is a division of U.S. application Ser. No. 10/241,458, filed on Sep. 12, 2002, now U.S. Pat. No. 7,035,982, and is based upon and claims the benefit of priority from the prior Japanese Patent Application No. 2001-298635, filed Sep. 27, 2001, the entire contents of each of which are incorporated herein by reference.

BACKGROUND OF THE INVENTION

1. Field of the Invention

The present invention relates to a memory-built-in data processor that performs data processing such as desired image processing by means of a built-in memory.

2. Description of the Related Art

With large-scaling of LSI, a semiconductor integrated circuit, a so-called memory consolidating logic LSI realizing high-speed data processing by fabricating a semiconductor memory such as DRAM and a logic circuit in a single integrated circuit chip has been developed. For example, such memory consolidating logic LSI is described by Jpn. Pat. Appln. KOKAI Publication No. 11-185467, and Jpn. Pat. Appln. KOKAI Publication No. 2000-67573.

The feature of the memory consolidating logic LSI is to enable memory access at higher speed than that of an external memory by linking a built-in memory and a logic circuit together with a bus of high bandwidth, thereby to realize high-speed data processing.

As the operation clock in the LSI is speeded up, it becomes difficult to make the entire LSI synchronize with the high-speed clock. If the clock frequency doubles with LSIs of the same size, the area of the region of the LSI, which is stable in synchronous operation, decreases to ¼. It is preferable for solving this problem to divide the interior of the LSI into a plurality of blocks, and perform only a closed process in each block.

The memory consolidating logic LSI configured to perform a closed process in the interior of the block can speed up the clock, but becomes impossible to access in real time only a memory of small capacity that can be arranged in a narrow region of each block. For this reason, there is a problem that the LSI can perform only data processing to treat the small amount of data that can be stored in a small capacity memory, that is, data processing of relatively small process amount, so that the contents of data processing is limited.

The object of the present invention is to provide a memory-built-in data processor that enables data processing of various process contents while utilizing high bandwidth by a built-in memory effectively.

BRIEF SUMMARY OF THE INVENTION

According to an aspect of the present invention, there is provided a memory-built-in data processor connected to an external unit, comprising: a memory which stores data; a first bus, a second bus and a third bus; a controller connected to the external unit and the memory via the first bus and the second bus, respectively; and a data processor connected to the controller via the third bus, the data processor performing read/write of data with respect to the memory via the third bus, the controller and the second bus, and subjecting the data to a desired processing; the controller performing arbitration between a first access requirement input via the first bus to perform readout/write-in with respect to the memory and a second access requirement input from the data processing unit via the third bus to access the memory; the memory, the first bus, the second bus, the third bus, the controller, and the data processor being integrated in an integrated circuit.

According to another aspect of the present invention, there is provided a memory-built-in data processor connected to an external unit, comprising: a plurality of first data processing parts each including a memory which stores data; a first bus, a second bus and a third bus; a controller connected to the external unit and the memory via the first bus and the second bus, respectively; and a data processing unit connected to the controller via the third bus, the data processing unit performing readout/write-in of data with respect to the memory via the third bus, the controller and the second bus, and subjecting the data to desired processing, the controller performing arbitration between a first access requirement input via the first bus to perform readout/write-in with respect to the memory and a second access requirement input from the data processing unit via the third bus to access the memory; at least one second data processing part which accesses the whole of the memories of the plurality of first data processing parts as one memory space, the second data processing part performing readout/write-in of data with respect to the memories and subjecting the data to a desired data processing; and an interface which connects the external unit to the second data processing part, the plurality of first data processing parts, the second data processing part, and the interface being integrated in an integrated circuit.

BRIEF DESCRIPTION OF THE SEVERAL VIEWS OF THE DRAWING

FIG. 1 shows a block diagram of an image processing system that can be applied to a memory-built-in data processor related to an embodiment of the present invention, FIGS. 5A and 5B show a one-dimensional stripe type addressing method and a one-dimensional block type addressing method for a local unit of a distributor in the second embodiment, FIG. 6 shows a flowchart for explaining a process selecting which rendering unit of a local unit and a global unit according to an input polygon in the second embodiment.

DETAILED DESCRIPTION OF THE INVENTION

Figure 2:
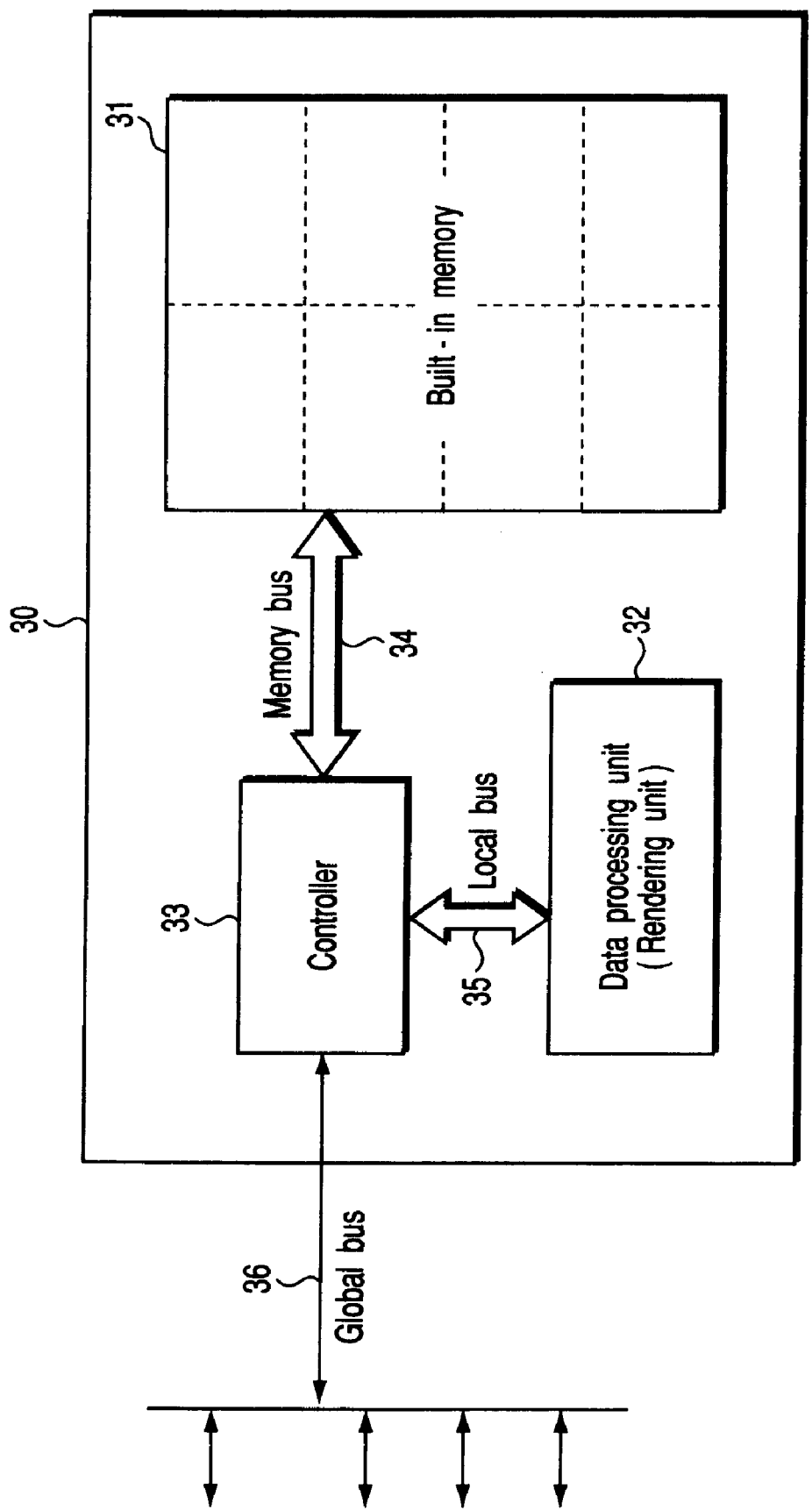
FIG. 2 shows a block diagram of a memory-built-in data processor related to the first embodiment of the present invention.

An embodiment of the present invention will now be described with reference to drawings.

FIG. 1 shows an image processing system as an example of a system which can apply the memory-built-in data processor according to an embodiment of the present invention. A controller 11, a DVD drive 12, a hard disk drive 13, a video input device 14 and a communication unit 15 as user input equipment are connected to a main bus 10. The DVD drive 12 plays back a DVD (digital versatile disc) which stores application software such as a game or movie/music data or plays back to a rewritable DVD. The hard disk drive 13 is used as external memory storage of large capacity to accumulate image data, for example. The video input device 14 is a digital still camera, a digital video camera or a scanner, and outputs a video signal of still images or motion images to be image-processed. The communication unit 15 communicates with external equipment via a network such as the Internet.

A CPU 17 and a video processor 20 are connected to the bus 10 via a bus bridge 16. A main memory 18 is connected to the CPU 17, and an external memory 19 is connected to the video processor 20 as needed. A digital-to-analog (D/A) converter 21 is connected to the video processor 20.

The video processor 20 is used for rendering arithmetic processing when the image processing system is a real-time three dimension graphics system used for computer game machines, for example. A video game software stored in the DVD is read out by the DVD drive 12, transferred to the main memory 18, and executed by the CPU 16 according to user operation input form the controller 11. As a result, three-dimensional spatial data is updated, and shape primitive data is sent to the video processor 20 by the CPU 16 to execute drawing arithmetic processing, referred to as rendering.

The rendering is a processing for expressing the three-dimensional space by using polygons as the shape primitive of the object and rendering (filling) these polygons. Processes such as texture mapping, hidden-surface removal, lighting (illumination computation), shading (shadowing), anti-aliasing, perspective projection and clipping as known in the field of three-dimension computer graphic (CG) generally is referred to as rendering. The rendering may include a vertex process. The vertex process is a process for calculating a parameter to be necessary for rendering the polygon in units of a pixel every vertex of a polygon mesh. This vertex process may be performed not only by the video processor 20, but also by the CPU 16.

On the other hand, the video processor 20 can perform processes such as various filtering processes for the video signal of still images or motion images input from the video input device 14. The image data output from the video processor 20 is converted to a video signal by the D/A converter 21. The video signal is displayed on the display, and output as a hard copy as necessary.

The memory-built-in data processor according to an embodiment of the present invention is applied to the video processor 20 in the image processing system shown in FIG. 1, for example. The memory-built-in data processor will be described concretely hereinafter.

The First Embodiment

FIG. 2 shows a configuration of the memory-built-in data processor related to the first embodiment of the present invention. The memory-built-in data processor 30 of FIG. 2 is realized by so-called a memory consolidating logic LSI wherein a built-in memory 31 such as DRAM, a data processing unit 32 and a controller 33 are integrated in a single LSI (large-scale semiconductor integrated circuit). The data processing unit 32 is a rendering unit configured to depict the polygons as described above or a SIMD (single instruction multiple data) type parallel processor configured to perform image processing and so on. The data processing unit 32 executes the above processes while accessing the built-in memory via the controller 33, i.e., performing readout and write-in of data. That is, the data processing unit 32 and controller 33 can execute instructions of a computer program stored on a computer readable storage medium to perform the processes therein.

A memory bus 34 connects the built-in memory 31 and controller 33 to each other, and a local bus 35 connects the data processing unit 32 and controller 33 to each other. The controller 33 is connected to an external unit by a global bus 36. The buses 34 and 35 and a part of the bus 36 are formed as internal wirings of the memory consolidating logic LSI. Assuming that the memory-built-in data processor 30 is the video processor 20 in the image processing system of FIG. 1, for example. The external unit is a CPU 17 and an external memory connected via the bus bridge 16 shown in FIG. 1.

The memory bus 34 and local bus 35 are realized by the wiring in the LSI as described above. Therefore, these buses have shorter wiring length, broader data bus width and higher bus clock in comparison with the global bus 36 used for connection to the external unit. Therefore, the memory bus 34 and local bus 35 can transfer data at high speed in comparison with the global bus 36. The data processing unit 32 can access the built-in memory 31 at high speed and high bandwidth via the local bus 35, controller 33 and memory bus 34.

The controller 33 arbitrates between the access requests that are performed via a plurality of routes for readout and write-in of data with respect to the built-in memory 31. In other words, the controller 33 accesses the built-in memory 31 via the memory bus 34 to perform readout/write-in operations while performing an arbitration process between the access requirement by way of the local bus 35 and the access requirement by way of the global bus 36. There are following four methods of arbitrating between the access requirements.

[Global Priority Access]

When the global controller 33 receives the access requirement from the external unit by way of the global bus 36, it stops the access requirement from the data processing unit 32 by way of the local bus 35 and accesses the memory according to the access requirement by way of the global bus 36. When a serial process is finished, the controller 33 accepts the access requirement by way of the local bus 35.

[Local Priority Access]

When the controller 33 receives the access requirement from the data processing unit 32 by way of the local bus 35, it stops the access requirement from the external unit by way of the global bus 36 and accesses the built-in memory according to the access requirement by way of the local bus 35. When a serial process is finished, the controller 33 accepts the access requirement by way of the global bus 36.

[Allegation Access]

The controller 33 accepts either the access requirement by way of the global bus 36 or the access requirement by way of local bus 35 every data access.

[Simultaneous Access]

In a case of that the controller 33 receives the access requirement by way of the local bus 35 and the access requirement by way of the global bus 36 simultaneously, that is, receives a simultaneous access request, if the access destination addresses correspond to different banks of the built-in memory 31, the controller 33 accepts this simultaneous access request, if the access destination address correspond to different banks, the controller 33 gives priority to one of the access requirements and keeps the other waiting.

Figure 3A:
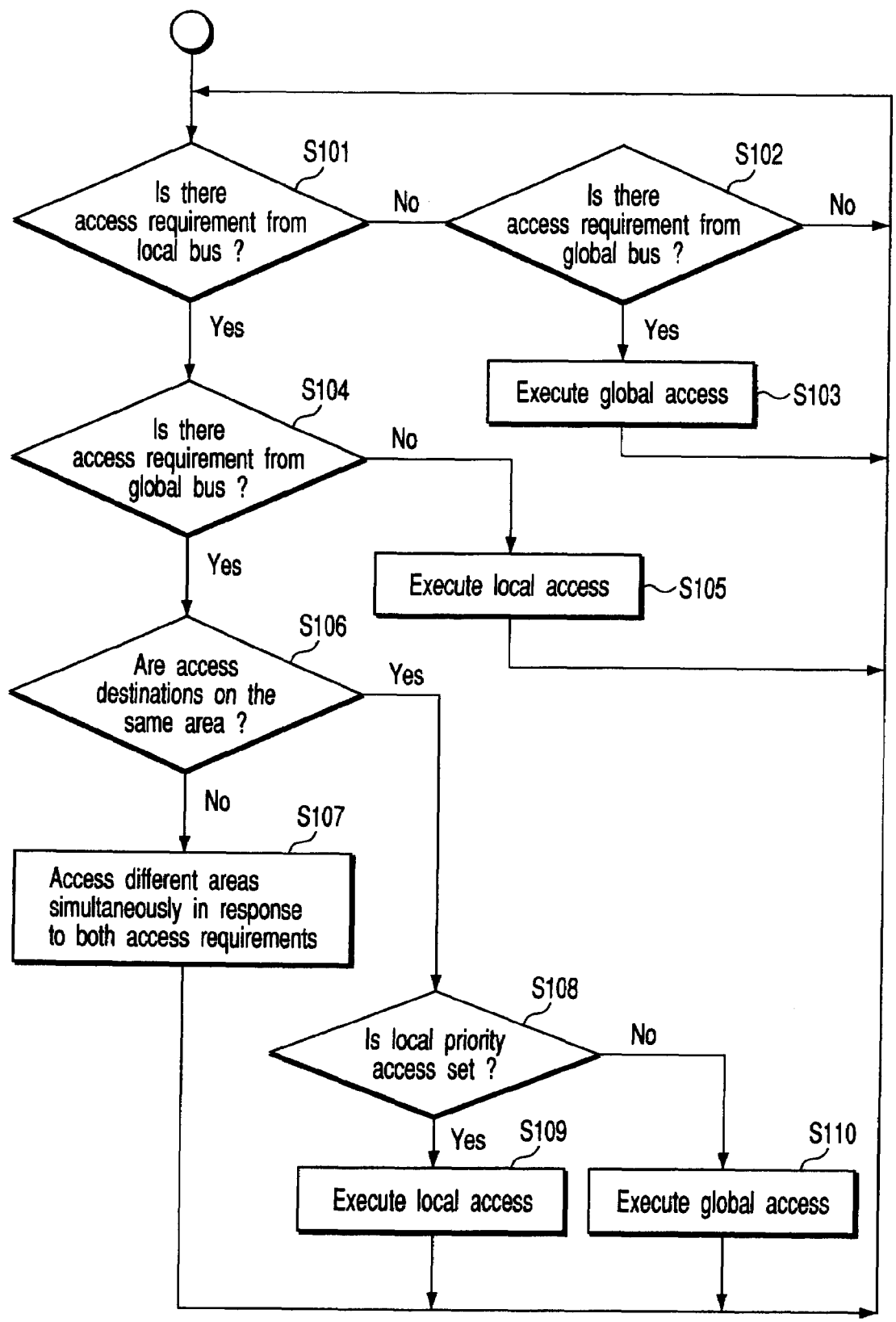
FIGS. 3A and 3B show flowcharts for explaining an arbitration process and an interface operation which are done by a controller which requests to access the built-in memory via 1a local bus and a global bus in the above embodiment.

An example of an arbitration process of the access requirement to the built-in memory 31 in the present embodiment will be described referring to FIG. 3A. FIG. 3A shows a flowchart of an arbitration process, but this arbitration process is performed by hardware in the controller 33 in order to speed up the entire process of the memory-built-in data processor 30.

At first, the controller 33 checks an access requirement from the local bus 35 (step S101). If there is no access requirement from the local bus 35, the controller 33 checks the access requirement from the global bus 36 (step S102). If there is access requirement from the global bus 36, the controller 33 executes a process corresponding to the access requirement from the global bus 36 (global access process) (step S103).

If there is an access requirement from the local bus 35 in step S101, the controller 33 checks further the access requirement from the global bus 36 (step S104). If there is no access requirement from the global bus 36, the controller 33 executes a process corresponding to the access requirement from the local bus 35 (local access process) (step S105). If there is an access requirement from the global bus 36 in the step S104, that is, if the controller 33 receives the access requirement from the local bus 35 and the access requirement from the global bus 36 at the same time, the controller 33 checks whether access destinations (addresses) of these access requirements are on the same area (bank). If the access destinations of the access requirements from the local bus 35 and the global bus 36 are in different areas, the controller 33 performs the simultaneous access for these areas (step S107).

In step S106, if the access destinations of the access requirements from the local bus 35 and the global bus 36 are in the same area, the controller 33 checks whether the local bus access is set (step S108). If a local priority access is set, the controller 33 performs a local access process (step S109). If the local priority access is not set, the controller 33 performs a global access process (step S110).

In step S106 in FIG. 3A, when the access requirements from the local bus 35 and the global bus 36 are directed to an access destination in the same area, whether the local priority access is set in step S108 is checked and either of the local access process or global access process is performed according to the result. However, whether the global priority access is set in step S108 may be checked. If the global priority access is set, the global access process is performed, and if the global priority access is not set, the local access process may be performed.

The controller 33 performs the arbitration process described above with respect to the access requirements from the local bus 35 and the global bus 36 to the built-in memory 31. Further, the controller 33 has a function for managing the built-in memory 31 by dividing the built-in memory 31 into a plurality of areas, that is, a function for managing selectively an area accessable via the local bus 35 and an area accessable via the global bus 36 as shown in dashed lines in FIG. 2 in order to enable the simultaneous access by step S107 of FIG. 3A.

Figure 3B:
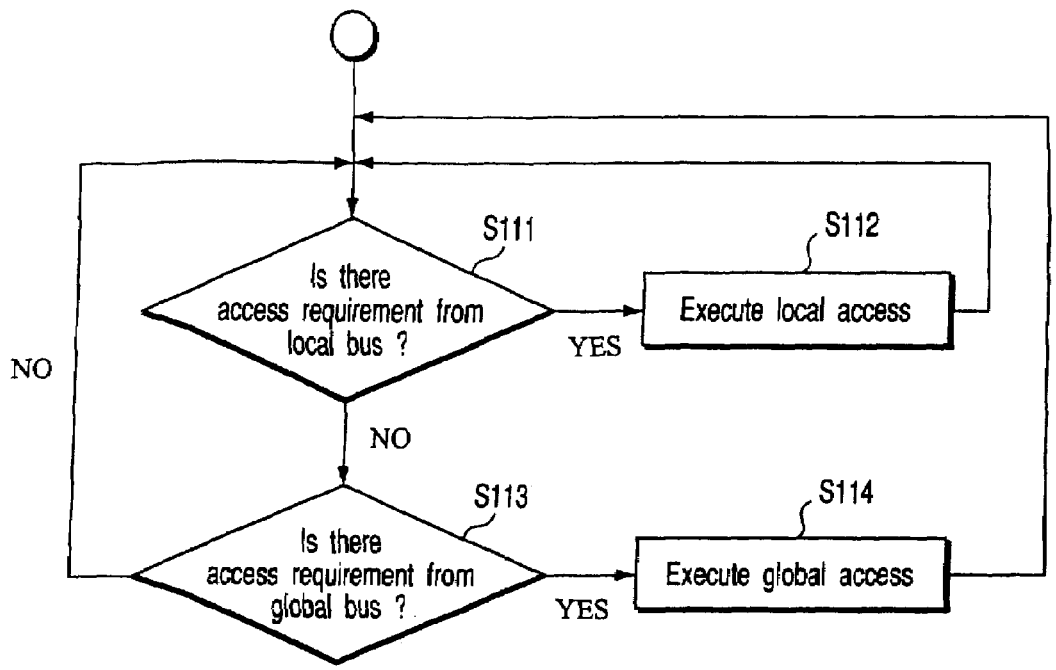

An interface operation based on a local bus priority will be described with reference to the flowchart of FIG. 3B.

At first an access requirement from the local bus is checked (S111). If there is the local access requirement, a local access process is executed (S112), and if there is not, an access requirement from the global bus is checked (S113). If there is the global access requirement, a global access process is executed (S114), and if there is not, a process returns to step S111.

As described above, in the interface operation, the local access process is performed in response to the access requirement from the local bus, and the global access process is performed in response to the global access requirement.

Parallel writing and parallel read-out of the data processor of the first embodiment will be described.

<Parallel Writing>

The built-in memory 31 is divided into at least two regions. The data processing unit 32 executes a process by means of one of the divided regions, and transfers data from the global bus 36 to the other of the divided regions together with the process. As this data transfer, there is an operation to send data for a process which the data processing unit 32 is to execute next, to the divided region. For example, while the local unit depicts polygon, the global unit transfers data (vertex information, texture) to be necessary for rendering a next polygon, to the local unit. In this case, the controller 33 performs control for the local bus priority.

<Parallel Read-Out>

The data processing unit 32 transfers data to the global bus 36 from different memory regions of the built-in memory 31. In this case, the data processing unit 32 performs an operation for outputting data indicating a result of a previous process. For example, the local unit executes polygon rendering, and the global unit brings in the image of the region in which the rendering has been completed. The controller 33 controls the local unit in the local bus priority. In the parallel writing and parallel read-out operation, the data processing unit may comprise a rendering unit.

Since the controller 33 has the function described above, the simultaneous access efficiency is improved, and data corruption due to the fact that access to an area accessable via a local bus 35 is gained via a global bus 36, and vice versa, can be prevented. This is preferable in light of protection of data stored in the built-in memory 31.

The Second Embodiment

Figure 4:
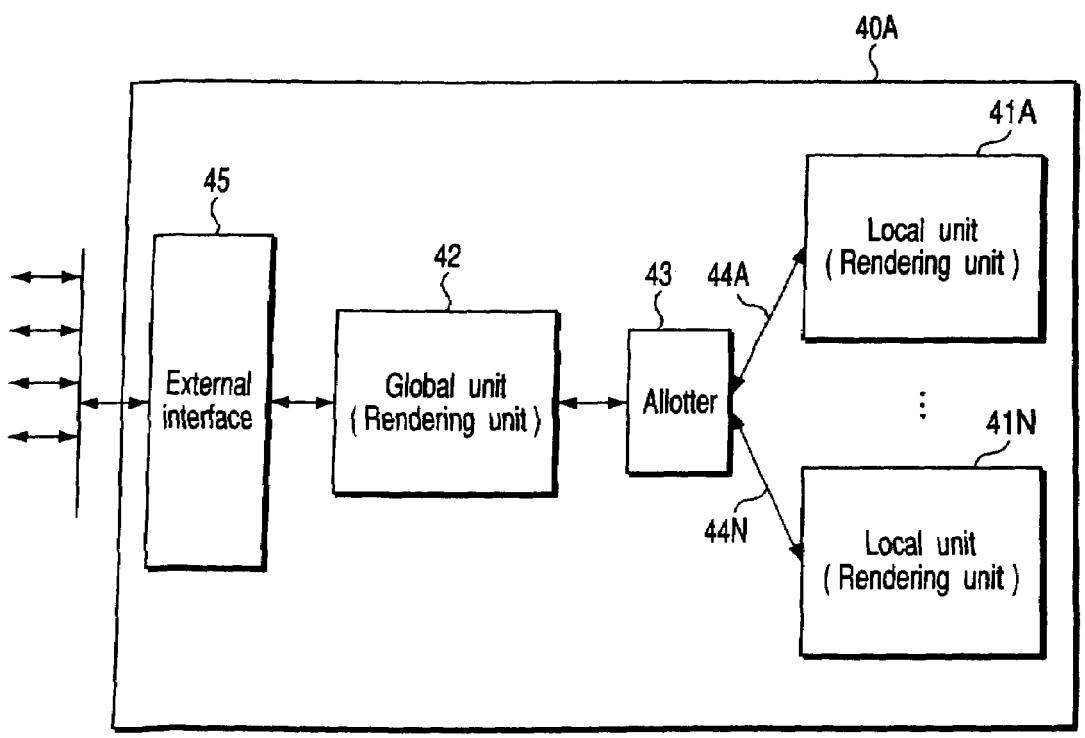
FIG. 4 shows a block diagram of a memory-built-in data processor related to the second embodiment of the present invention.

FIG. 4 shows a configuration of a memory-built-in data processor related to the second embodiment of the present invention. The memory-built-in data processor 40A shown in FIG. 4 comprises a plurality of data processing units (first data processing units, referred to as local units hereinafter) 41A-41N and a data processing unit (the second data processing unit, referred to as a global unit hereinafter) 42. Each of the first data processing units 41A-41N comprises a memory-built-in data processor 30 related to the first embodiment shown in FIG. 2. In other words, the memory built-in processor 40A provides a plurality of local units 41A-41N each having the same configuration as that of the memory-built-in data processor 30 shown in FIG. 2.

The global unit 42 is a data processing unit such as a general-purpose processor or a rendering unit, and connected to the local units 41A-41N via the global bus 44A to 44N led from an allotter 43 and the local units 41A-41N. The global unit 42 is configured so as to be able to access (read and write) the built-in memories via the allotter 43 and global buses 44A to 44N with considering the whole of the built-in memories (the built-in memory 31 in FIG. 2) of the local units 41A-41N to be one address space.

The global unit 42 can deliver data with respect to an external unit over an external interface 45. When the memory-built-in data processor 40A is the video processor 20 in the image processing system as shown in FIG. 1, the external unit connected to the external interface 45 is the CPU 17 connected via the bus bridge 16, the external memory 19 and the like.

The allotter 43 has a function to perform selection of the local units 41A-41N and addressing of the built-in memory according to the access requirement from the global unit 42. When the allotter 43 receives the access requirement from the global unit 42, it accesses the built-in memory corresponding to the access requirement by selecting an appropriate local unit of the local units 41A-41N, converting the address indicated by the access requirement from the global unit 42 to an address assigned to the selected local unit in the address space of the whole built-in memories of the local units 41A-41N, and distributing the address to the selected local unit.

FIGS. 5A and 5B show a method that the allotter 43 performs addressing (memory mapping) with respect to the local units 41A-41N according to control from the global unit 42. FIG. 5A shows a one-dimensional stripe type method, and FIG. 5B shows a one-dimensional block type method. FIGS. 5A and 5B indicate the local units 41A-41N with local units 1 to N. In the one-dimensional stripe type addressing method, the addresses of the same local unit are arranged in a stripe, that is, between the addresses of the different local units as shown in FIG. 5A. The same addresses i (i=1, 2, ..., N) of the different local units are arranged continually. In the one-dimensional block type addressing method, the different addresses i (i=1, 2, ..., N) of the same local unit are arranged continuously as shown in FIG. 5B to form blocks of addresses.

Two-dimensional stripe type and block type addressing methods suitable for graphics processing are known. These methods can be applied to the present embodiment, too. The allotter 43 may use selectively one of the plural addressing methods according to intended use or processing contents of the memory-built-in data processor, and is fixed to one of the methods.

According to the present embodiment, in each of the local units 41A-41N, high-speed processing can be realized by a high-speed data transmission via the bandwidth memory bus and local bus as described in the first embodiment. On the other hand, as the whole of the memory-built-in data processor 40A, when viewing the local unit 41A-41N from the global unit 42 via the allotter 43, the built-in memories of the local units 41A-41N can be accessed as mass storage having one address space. For this reason, it is possible to realize a process that handles a large quantity of data at a processing speed. In other words, it is possible to select the operation mode of the memory-built-in data processor 40A according to the process contents. Therefore, a flexible data processor can be realized.

By making both local unit 41A-41N and global unit 42 bring a function of a rendering unit as a concrete application of the present embodiment, the memory built-in processing unit 40A can function as a drawing apparatus in a three-dimensional graphics system. In this case, polygon data is input to the global unit 42 from the external unit via the external interface 45. The global unit 42 depicts big polygons and the local units 41A-41N each depict only small polygons. Thus, a circuit of a rendering unit in each of the local units 41A-41N can be scaled down in comparison with that of the global unit 42.

In the embodiment of FIG. 4, each of the local units 41A to 41N accesses to one of the memory areas of the built-in memory to perform arithmetic processing by means of the built-in memory, and at the same time the external interface 45 and global unit 42 transfer data for a process of the next local unit to the other memory area of the built-in memory.

FIG. 6 shows a process selecting whether the polygon data is depicted by a rendering unit of which of the local units 41A-41N and global unit 42 according to the polygon size of the input polygon data. This selection process is performed in the global unit 42 according to the size (polygon size) of the polygon data (shape primitive data) input via the external interface 45.

At first, it is determined whether the polygon size of the input polygon data is a data size capable of being processed with the local units 41A-41N (step S201). If the size of the input polygon data is the data size capable of being processed with the local units 41A-41N, a suitable one of the local units 41A-41N is selected, and the polygon data is transferred to the selected local unit to be depicted (steps S202 and S203). On the other hand, if it is determined that the input polygon data cannot be processed by the local units 41A-41N in step S201, the global unit 42 depicts the polygon data.

It is preferable for speedup of the process of the memory-built-in data processor 40A that the selection process of FIG. 6 is realized by hardware of the global unit 42.

The Third Embodiment

Figure 7:
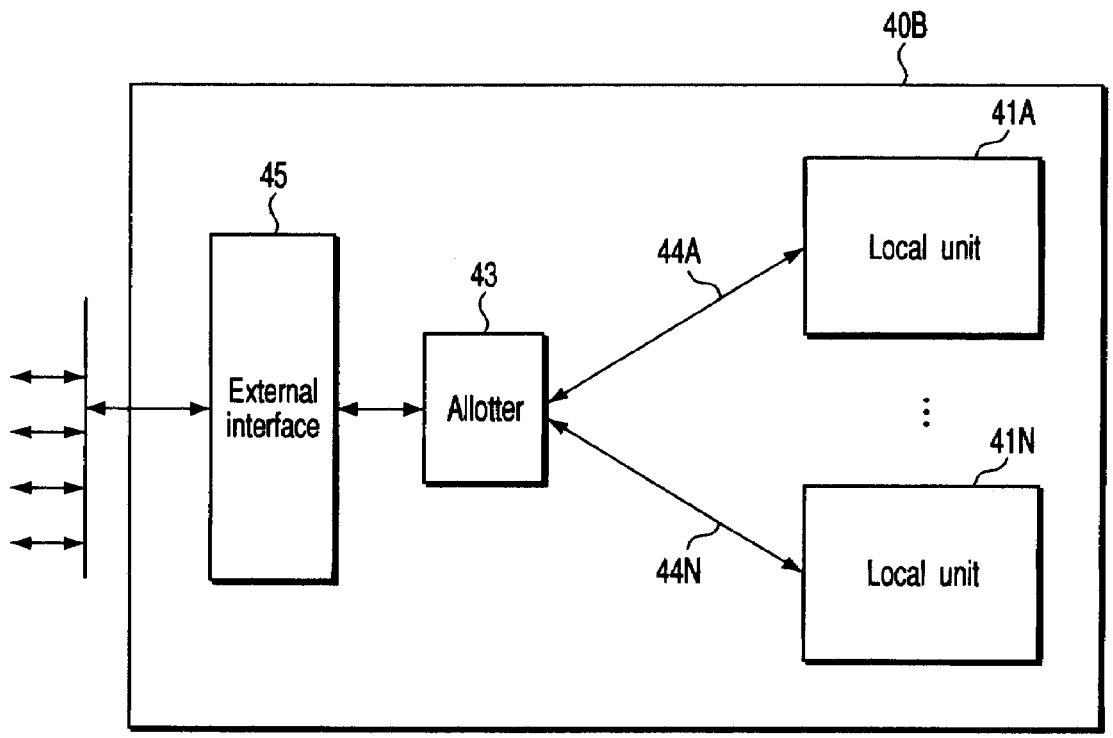
FIG. 7 shows a block diagram of a memory-built-in data processor related to the third embodiment of the present invention.

FIG. 7 shows a configuration of the memory-built-in data processor 40B related to the third embodiment of the present invention, wherein the global unit 42 is removed from the memory-built-in data processor 40A related to the second embodiment that is shown in FIG. 5 and the external interface 45 is directly connected to the allotter 42. The memory-built-in data processor of the present embodiment can be considered as the global unit whose external interface 45 has no data processing function such as rendering.

Each of the local units 41A-41N of the present embodiment can realize high-speed processing with the high-speed data transfer by way of the bandwidth memory bus and local bus similarly to the second embodiment. As for the whole of the memory-built-in data processor 40B, when viewing the local units 41A-41N from the external unit via the external interface 45 and allotter 43, the whole of the built-in memories of the local units 41A-41N can be assumed as a mass storage having one address space and accessed. Therefore, the third embodiment is substantially the same as the second embodiment excepting for selectively rendering with the local unit and global unit according to the input polygon data.

In the embodiment of FIG. 7, each of the local units 41A to 41N accesses to the built-in memory to perform arithmetic processing by means of the built-in memory, and at the same time the external interface 45 and global unit 42 transfer data for a process of the next local unit to the other region of the built-in memory.

The Fourth Embodiment

Figure 8:
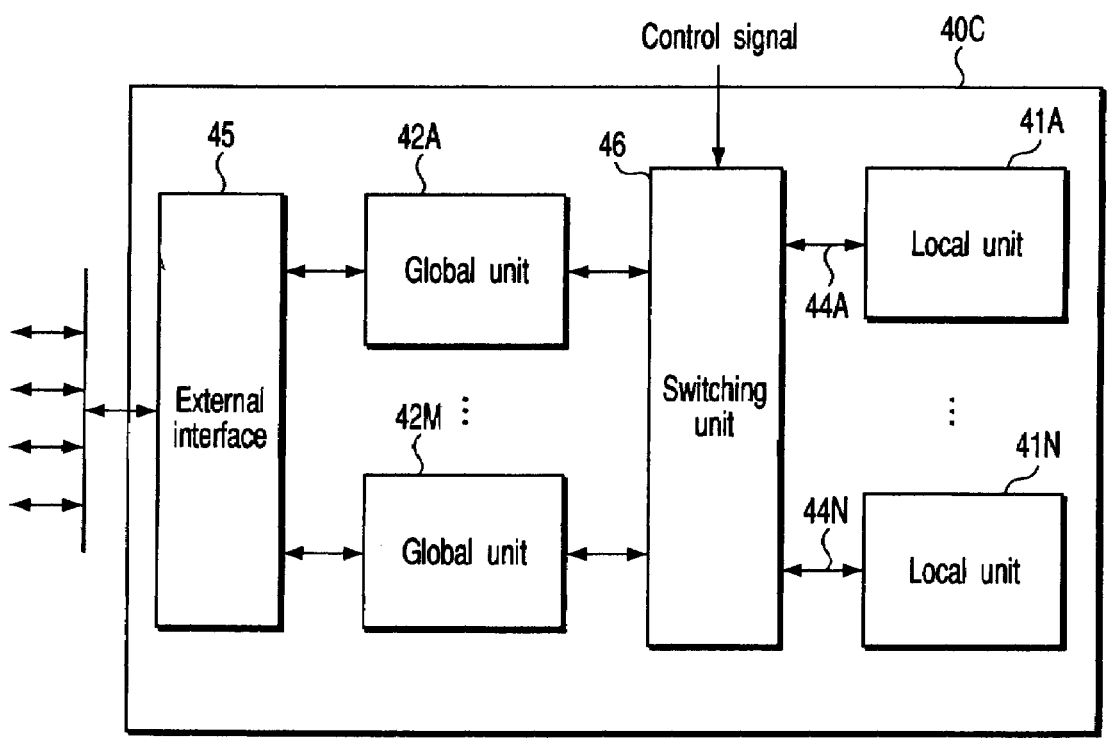
FIG. 8 shows a block diagram of a memory-built-in data processor related to the fourth embodiment of the present invention.

FIG. 8 shows a configuration of a memory-built-in data processor 40C related to the fourth embodiment of the present invention. The memory-built-in data processor 40C of the present embodiment has plural local units 41A-41N and plural global units 42A-42M, and the local units 41A-41N are optionally connected to the global units 42A-42M by a switching unit 46.

The switching unit 46 performs switching between the local units 41A-41N and the global units 42A-42M. In other words, the switching unit 46 connects each of the local units 41A-41N to one or more of the global units 42A-42M and may use a conventional crossbar switch or a shared bus.

The switching unit 46 performs the switching connection between the local units 41A-41N and the global units 42A-42M according to an external control signal. In the image processing system shown in FIG. 1, for example, the external control signal is generated by the CPU 17 according to designation of a user which is input via the controller 11 in FIG. 1, for example, and input to the video processor 20 that is the memory-built-in data processor 40C of the present embodiment.

On the other hand, the external interface 45 has a distribution/combination function for distributing data or signals from the external unit to the global units 42A-42M or combining data or signals from the global units 42A-42M on a shared bus.

According to the present embodiment, plural global units 42A-42M and plural local units 41A-41N are provided. It is possible by switching between the global units 42A-42M and the local units 41A-41N by means of the switching unit, to expand data processing efficiency in comparison with the memory-built-in data processor 40B related to the second embodiment shown in FIG. 4 and improve total performance of data processing.

The Fifth Embodiment

Figure 9:
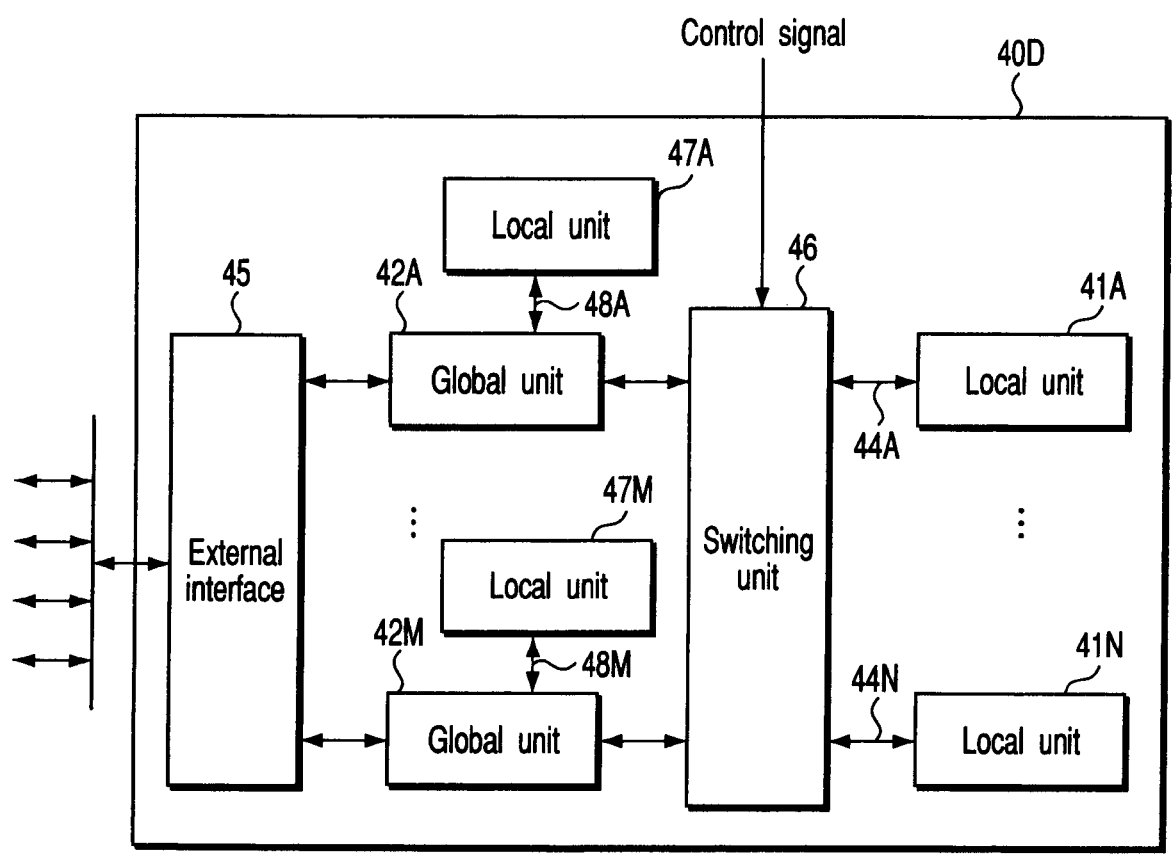
FIG. 9 shows a block diagram of a memory-built-in data processor related to the fifth embodiment of the present invention.

FIG. 9 shows a configuration of the memory-built-in data processor 40D related to the fifth embodiment of the present invention. The memory-built-in data processor 40D of the present embodiment is configured by other data processing units (the third data processing units), i.e., local units 47A-47M, corresponding to the global units 42A-42M one-on-one, as well as the memory-built-in data processor 40C related to the fourth embodiment shown in FIG. 8. The global units 42A-42M are connected to the local units 47A-47M by the global buses 48A-48M, respectively. The local units 47A-47M each have the same configuration as the memory-built-in data processor shown in FIG. 2 similarly to the local units 41A-41N.

In the second embodiment, the local units 41A-41N and global unit 42 provide the rendering function in the memory-built-in data processor 40B shown in FIG. 7. In contrast, in the present embodiment, the rendering function is eliminated from the global unit 42A-42M and added to the local units 47A to 47M.

In other words, the local units 41A-41N connected to the global units 42A-42M via the switching unit 46 are shared local units used in common with respect to the global units 42A-42M. In contrast, the local units 47A-47M are dedicated local units used only by the global units 42A-42M connected to the corresponding local units 47A-47M, respectively.

In other words, when performing the rendering process explained as a modification of, for example, the second embodiment in the present embodiment, polygons of small size are rendered by the shared local units 41A-41N, and polygons of large size are rendered by a pair of each of global units 42A-42M and each of the dedicated local units 47A-47M.

The present embodiment can produce the effect that improves the development efficiency of an apparatus while showing performance similar to the memory-built-in data processor 40C related to the fourth embodiment shown in FIG. 8, by making the shared local units 41A-41N and the dedicated local units 47A-47M with the same architecture.

The Sixth Embodiment

Figure 10:
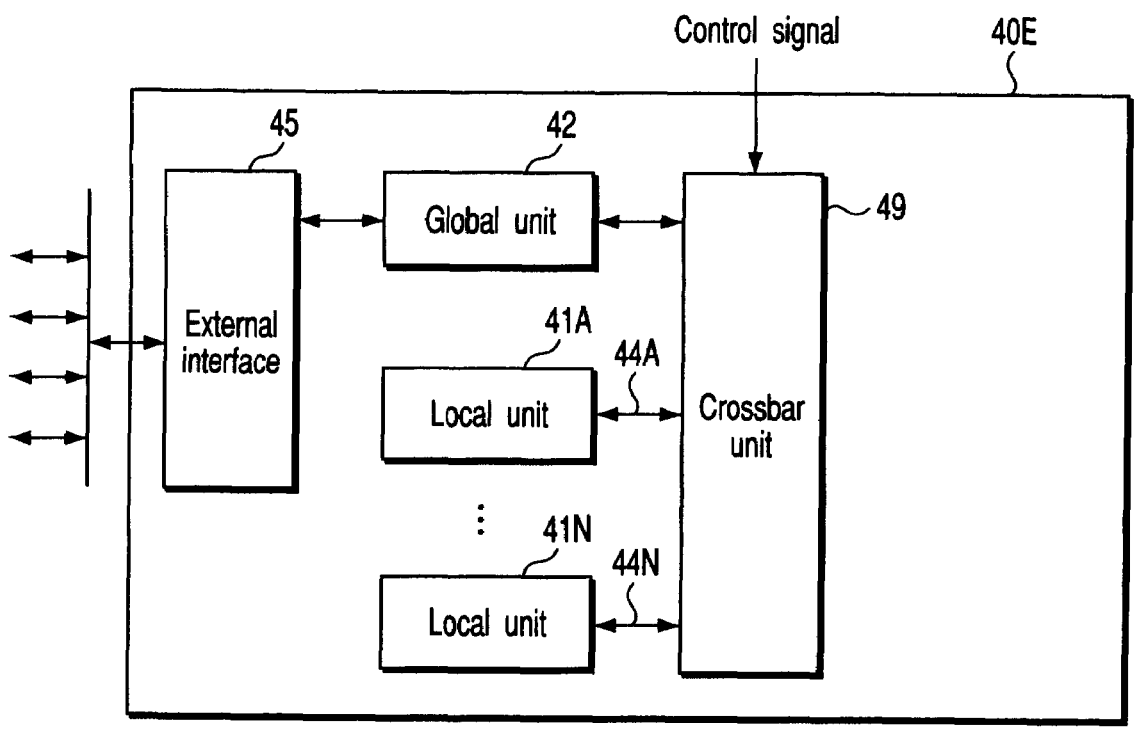
FIG. 10 shows a block diagram of a memory-built-in data processor related to the sixth embodiment of the present invention.

FIG. 10 shows a configuration of a memory-built-in data processor 40E related to the sixth embodiment of the present invention, wherein the global unit 42 and local units 41A-41N are connected by a crossbar unit 49. This is a configuration in which the allotter 43 in the memory-built-in data processor 40B shown in FIG. 4 and related to the second embodiment is substituted with the crossbar unit 49.

The crossbar unit 49 performs switching between the global unit 42 and the local units 41A-41N and between the local units 41A-41N according to an external control signal. In the image processing system shown in FIG. 1, for example, the external control signal is generated by the CPU 17 according to designation of a user which is input via the controller 11 in FIG. 1, for example, and input to the video processor 20 that is the memory-built-in data processor 40E of the present embodiment.

The present embodiment can take various other process aspects in comparison with the configuration that connects the global unit 42 and the local units 41A-41N via the allotter 43 as shown in FIG. 4. For example, it is possible to change the connection relation between the global unit 42 and the local units 41A-41N by the crossbar unit 49 according to the process contents of the memory-built-in data processor 40E.

Further, communication between the local units 41A-41N is enabled by optionally connecting the local units 41A-41N to each other by means of the crossbar unit 49. As a result, a data copy can be performed between the local units 41A-41N. This is profitable when the video processor 20 performs processing such as filtering with respect to the image data input by the video input device 14 of FIG. 1, for example.

In filtering, image data of a certain frame is stored in the built-in memory of a certain local unit, image data of the next frame is stored in the built-in memory of other local unit, and the image data stored in the built-in memory of the another local unit is copied and added to the built-in memory of the certain local unit. As a result, a process for averaging the image data of both frames and so on can be executed.

In the embodiment of FIG. 10, the local unit 42 can perform an operation according to a request from another local unit while it performs a process. In a case that the own data processing unit of the local unit 41A, for example, performs a process using the own built-in memory, when the local unit 41A receives a write-in request to the built-in memory from another local unit 41B or the global unit 42, it performs the following operation. When the built-in memory is divided into a plurality of memory areas, and the local unit and global unit access different memory areas, the data processing unit performs operations similar to <parallel write-in > and <parallel readout> described above.

On the other hand, assuming that the same memory area as the memory area which the local unit 41A accesses is accessed via the global bus. In this case, when the local units each comprising a rendering unit perform rendering in parallel, texture image and shader data are stored in the built-in memory of another local unit. In this case, the texture data stored in the built-in memory of the local unit 41A is used by the local unit 41B as well as the local unit 41A.

The above operation is controlled in the local access priority by the controller.

The Seventh Embodiment

Figure 11:
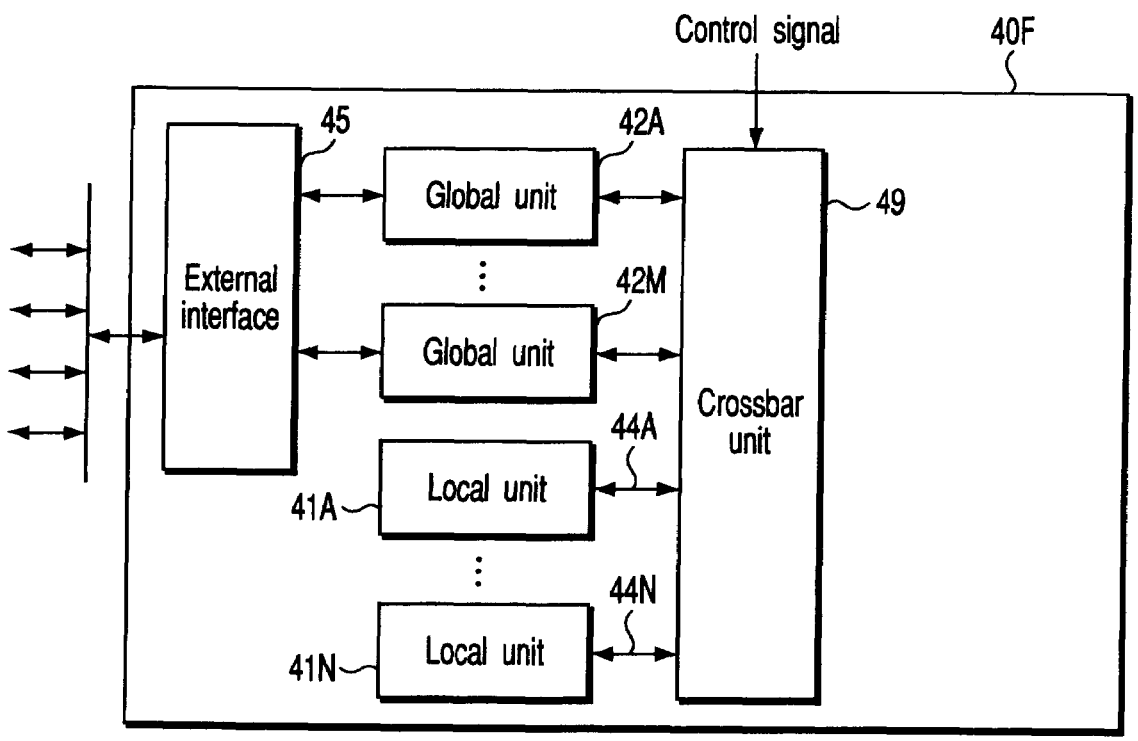
FIG. 11 shows a block diagram of memory-built-in data processor related to the seventh embodiment of the present invention.

FIG. 11 shows a configuration of a memory-built-in data processor 40F related to the seventh embodiment of the present invention, wherein the configuration of the sixth embodiment shown in FIG. 10 is improved so that plural global units 42A-42M and local units 41A-41N are connected by a crossbar unit 49.

The crossbar unit 49 performs switching between the global units 42 and the local units 41A-41N and switching between the local units 41A-41N according to an external control signal. In the image processing system shown in FIG. 1, for example, the external control signal is generated by the CPU 17 according to designation of a user which is input via the controller 11 in FIG. 1, for example, and input to the video processor 20 that is the memory-built-in data processor 40F of the present embodiment. In other words, the connection relation between the global units 42A-42M and the local units 41A-41N is changed by the crossbar unit 49 according to process contents of the memory-built-in data processor 40F. An arbitrary connection between the local units 41A-41N enables communication between the local units 41A-41N.

The present embodiment can take a process aspect similar to the fifth embodiment as well as the same effect as the sixth embodiment shown in FIG. 9. In other words, a part of the local units 41A-41N, for example, local units 41A-41M correspond to the global units 42A-42N one-on-one, the rendering function eliminated from the global units 42A-42N is added to the local units 41A-41M, and the local units 41A-41M are determined as dedicated local units used for only by the global units 42A-42N. On the other hand, another part of the local units 41A-41N are employed as the share local units used in common with respect to the global units 42A-42N.

The present embodiment can produce the effect that improves the development efficiency of an apparatus while showing performance similar to the memory-built-in data processor 40C related to the fourth embodiment shown in FIG. 8, by making the shared local units 41A-41N and the dedicated local units 47A-47M with the same architecture.

As described above, the present invention can provide a memory-built-in data processor that enables data processing of various process contents while utilizing high bandwidth by the built-in memory effectively.

A memory-built-in data processor of base configuration that is explained as a local unit, for example, can realize high-speed processing by high-speed data transmission. On the other hand, when the whole of the built-in memories of plural local units is assumed as a mass storage having an address space which is accessible, such process where a large quantity of data is handled at a slow processing speed can be realized.

Further, shader program and data as well as textured images can be included as main processing data. In the above embodiments, the polygon rendering is performed. However, the present invention can be applied to a rendering process of rendering in units of a pixel, such as ray-tracing, photon mapping. Furthermore, the present invention can be applied to an image processing of processing an image in units of a rectangle, such as image filter, template matching.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for processing data using a memory-built-in data processor connected to an external unit, the method comprising:

preparing a plurality of first data processing parts each comprising a memory configured to store data internal to the data processor and a data processing unit configured to perform readout/write-in of data with respect to the memory and configured to subject the data to desired processing, and at least one second data processing part;

accessing the whole of memories of the plurality of first data processing parts as one memory space with the second data processing part to perform readout/write-in of data with respect to the memories;

subjecting the data read from the memories to desired data processing;

performing arbitration between a first access requirement from the external unit to perform readout/write-in of data with respect to the memory and a second access requirement from the data processing unit to access the memory internally;

checking an access priority for local memory access internal to the data processor when memory access destinations of the first access requirement and the second access requirement are on the same area in the memory;

accessing the memory of the second access requirement if the access priority is set;

accessing the different areas simultaneously when memory access destinations of the first access requirement and the second access requirement are on different areas in the memory;

executing with the second data processing part to determine a polygon size of polygon data input from the external unit to make the first data processing part according to a position of a polygon represented by the polygon data depicting the polygon, when the polygon data has a polygon size capable of being depicted by the first data processing part, and to depict the polygon indicated by the polygon data, when the polygon data has a polygon size not capable of being depicted by the first data processing unit.

2. A method for processing data with a memory-built-in data processor apparatus connected to an external unit, the method comprising:

preparing a plurality of first data processing parts each comprising a memory configured to store data internal to the data processor and a data processing unit configured to perform readout/write-in of data with respect to the memory and configured to subject the data to desired processing, and at least one second data processing part;

accessing the whole of memories of a plurality of first data processing parts as one memory space with a second data processing part to perform readout/write-in of data with respect to the memories;

subjecting the data read from the memories to desired data processing with the second data processing part;

performing arbitration between a first access requirement from the external unit to perform readout/write-in with respect to the memory and a second access requirement from the data processing unit to access the memory internally;

checking an access priority for local memory access internal to the data processor when memory access destinations of the first access requirement and the second access requirement are on the same area in the memory;

accessing the memory of the second access requirement if the access priority is set;

accessing the different areas simultaneously when memory access destinations of the first access requirement and the second access requirement are on different areas in the memory; and selecting one of the first data processing parts according to the access requirement from the second data processing part;

converting an address indicated by the access requirement to an address assigned to the first data processing part selected in the memory space;

distributing a converted address to the first data processing part selected;

executing the second data processing part to determine a polygon size of polygon data input from the external unit to make the first data processing part selected according to a position of a polygon represented by the polygon data depicting the polygon, when the polygon data has a polygon size capable of being depicted by the first data processing part, and to depict the polygon indicated by the polygon data, when the polygon data has a polygon size not capable of being depicted by the first data processing part.

3. A computer readable storage medium storing instructions of a computer program which when executed by a computer results in performing operations comprising:

accessing the whole of memories of a plurality of first data processing parts as one memory space with a second data processing part to perform readout/write-in of data with respect to the memories;

subjecting the data read from the memories to desired data processing;

performing arbitration between a first access requirement from an external unit to perform readout/write-in of data with respect to the memory and a second access requirement from a data processing unit of each of the first data processing parts to access the memory internally;

checking an access priority for local memory access internal to the data processor when memory access destinations of the first access requirement and the second access requirement are on the same area in the memory;

accessing the memory of the second access requirement if the access priority is set;

accessing the different areas simultaneously when memory access destinations of the first access requirement and the second access requirement are on different areas in the memory;

executing in the second data processing part to determine a polygon size of polygon data input from the external unit to make the first data processing part according to a position of a polygon represented by the polygon data depicting the polygon, when the polygon data has a polygon size capable of being depicted by the first data processing part; and depicting the polygon indicated by the polygon data, when the polygon data has a polygon size not capable of being depicted by the first data processing unit.

4. A computer readable storage medium storing instructions of a computer program which when executed by a computer results in performing operations comprising:

accessing the whole of memories of a plurality of first data processing parts as one memory space with a second data processing part to perform readout/write-in of data with respect to the memories;

subjecting the data read from the memories to desired data processing with the second data processing part;

performing arbitration between a first access requirement from an external unit to perform readout/write-in of data with respect to the memory and a second access requirement from a data processing unit of each of the first data processing parts to access the memory internally;

checking an access priority for local memory access internal to a data processor when memory access destinations of the first access requirement and the second access requirement are on the same area in the memory;

accessing the memory of the second access requirement if the access priority is set;

accessing the different areas simultaneously when memory access destinations of the first access requirement and the second access requirement are on different areas in the memory;

selecting one of the first data processing parts according to the access requirement from the second data processing part;

converting an address indicated by the access requirement to an address assigned to the first data processing part selected in the memory space;

distributing a converted address to the first data processing part selected;

executing with the second data processing part to determine a polygon size of polygon data input from the external unit to make the first data processing part selected according to a position of a polygon represented by the polygon data depicting the polygon, when the polygon data has a polygon size capable of being depicted by the first data processing part, and to depict the polygon indicated by the polygon data, when the polygon data has a polygon size not capable of being depicted by the first data processing part.

* * * * *